US008880503B2

(12) United States Patent
Modi

(10) Patent No.: US 8,880,503 B2
(45) Date of Patent: Nov. 4, 2014

(54) VALUE-BASED POSITIONING FOR OUTER JOIN QUERIES

(75) Inventor: Jatan K. Modi, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 666 days.

(21) Appl. No.: 13/165,463

(22) Filed: Jun. 21, 2011

(65) Prior Publication Data

US 2012/0330923 A1 Dec. 27, 2012

(51) Int. Cl.
*G06F 7/00* (2006.01)
*G06F 17/30* (2006.01)

(52) U.S. Cl.
CPC .... *G06F 17/30442* (2013.01); *G06F 17/30466* (2013.01); *G06F 17/30498* (2013.01)
USPC .......................................... 707/713; 707/714

(58) Field of Classification Search
CPC ...................... G06F 17/30466; G06F 17/30498
USPC ....................................... 707/713, 714, 999.2
See application file for complete search history.

(56) References Cited

U.S. PATENT DOCUMENTS

| | | | | |
|---|---|---|---|---|
| 5,918,224 | A * | 6/1999 | Bredenberg | 707/999.001 |
| 5,963,933 | A | 10/1999 | Cheng | |
| 6,898,593 | B1 * | 5/2005 | Mulukutla et al. | 707/999.003 |
| 7,406,468 | B2 | 7/2008 | Larson | |
| 7,574,421 | B2 | 8/2009 | Pahno | |
| 7,739,219 | B2 | 6/2010 | Liu | |
| 8,015,179 | B2 * | 9/2011 | Koudas et al. | 707/716 |
| 2005/0044102 | A1 * | 2/2005 | Gupta et al. | 707/102 |
| 2007/0233642 | A1 * | 10/2007 | Pahno | 707/2 |
| 2009/0063533 | A1 * | 3/2009 | Ting | 707/102 |
| 2012/0150791 | A1 * | 6/2012 | Willson | 707/600 |

OTHER PUBLICATIONS

Query Processing and Optimization in Temporal Object-Oriented Databases—Published Date: 1997 http://ieeexplore.ieee.org/stamp/stamp.jsp?tp=&arnumber=617334.
From—Retrieved Date: Feb. 28, 2011 http://msdn.microsoft.com/en-us/library/bb387167.aspx.
Refresh, reread, research, executeQuery—which one to use?—Retrieved Date: Feb. 28, 2011 http://mafsarkhan.blogspot.com/2010/05/refresh-reread-research-executequery.html.
Ramakrsihnan et al., "SRQL: Sorted Relational Query Language", In Proceedings of the Tenth International Conference on Scientific and Statistical Database Management (SSDBM), Jul. 1998, 12 pages.

* cited by examiner

*Primary Examiner* — Hares Jami
(74) *Attorney, Agent, or Firm* — Damon Rieth; Jim Ross; Micky Minhas

(57) ABSTRACT

Enterprise systems, methods and computer program products are disclosed for providing value-based positioning for outer join database queries in an enterprise resource planning system operating on a specially programmed computer server. The computer implemented method comprises; receiving a query at a server and processing the query for inner join and then evaluating a returned value for Order by direction and whether the current row returns NULL. Depending on forward paging and reverse paging for outer join, the process involves changing an inequality operator depending on the evaluated Order by direction and whether the current row is NULL. The process for inner join and outer join queries is implemented on an application object server including a kernel instance, a query framework and query generation model and a data access layer engine to a database of the enterprise resource planning system.

20 Claims, 5 Drawing Sheets

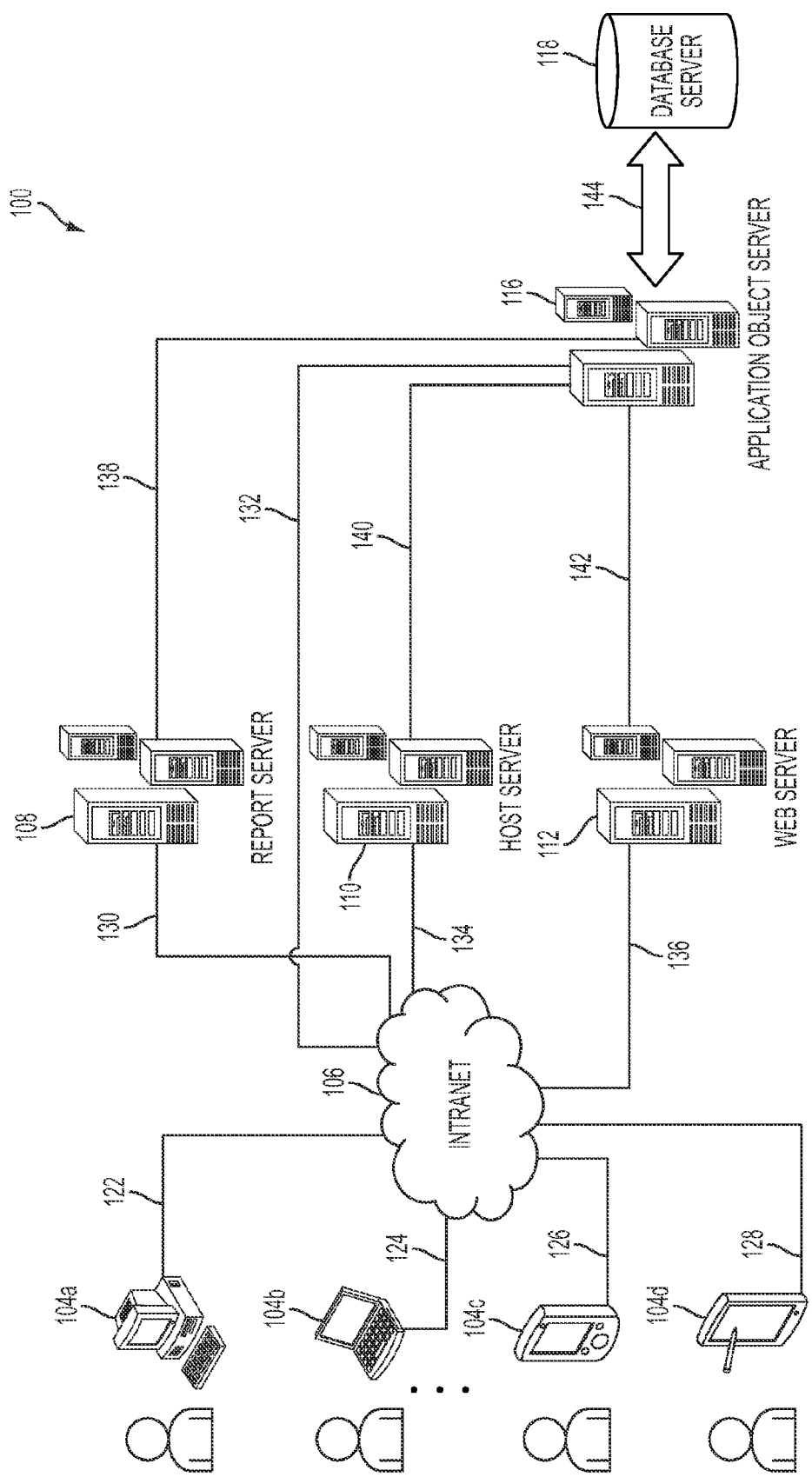

VALUE-BASED POSITIONING FOR OUTER JOIN QUERIES

FIELD OF THE INVENTION

The present invention generally relates to enterprise computer systems and methods and more particularly to systems, methods and computer program products for facilitating value-based positioning for outer join database queries in an enterprise resource planning system operating on a specially programmed computer server.

BACKGROUND

In today's technological environment, it is common for enterprises such as business organizations, schools, charitable organizations and government organizations to deploy private computer networks—intranets—to securely share such organization's information or network operating system within that organization. The term "intranet" is used in contrast to "internet", which is a network between and among individuals and organizations, the most common of which is the global, public Internet. That is, an intranet is a network within an enterprise which sometimes refers only to an internal (private) website, but may be a more extensive part of the enterprise's information technology (IT) infrastructure. For example, in many enterprises, an employee may work from home and gain access to the enterprise via a portal requiring additional security hurdles such as synchronous keys for entry. An enterprise intranet may host multiple private websites and constitute an important component and focal point of internal communication with, and collaboration among, individual computer users associated/affiliated with the enterprise (e.g., students within a university, co-workers within a company, members of a governmental department or the like).

As individual computer users associated/affiliated with the enterprise perform various computer-based activities while logged into the intranet, these users may utilize enterprise resource planning (ERP) client/server systems as provided by the enterprise. One such system known as the Dynamics® AX 2009 ERP system available from Microsoft Corporation of Redmond, Wash. provides a database query server and associated application object server among other features. These are routinely accessed by a client, for example, to query the database for data contained in tables. Data that may populate a given field of a business document or form and may be recorded in several different database tables. The database may, thus, comprise a plurality of related tables of data, for example, related to everyday activities of the enterprise and related by the data recorded in the table.

A member of the enterprise may perform a query of the database known as a join query in which, for example, in the structured query language (SQL), a join query relates to a query in which two (or more) tables of data of a database are temporarily joined in order to select data of the tables. To perform a join query, information in the query may comprise at least one table, a column or row and a condition to make the join temporarily occur. A join query may involve selection of data for update. An example follows:

```
UPDATE a
SET a.[updated_column] =
updatevalue
FROM tableb
JOIN tablec
ON ...
WHERE ...
```

In this UPDATE, there is a JOIN of tableb and tablec and there is also an updatevalue, for example, based on a WHERE condition.

In the known Dynamics AX 2009 ERP system, a join query may be processed at the database each time the join is executed. A join query typically involves paging. Paging obtains its name from accessing pages of data of a database. Paging may begin, for example, with a structured query language (SQL) SELECT. For example, given a SQL and a selected row in the result of the query, one may generate two separate queries such that a "forward" query results in all subsequent rows and a "backward" query results in all previous rows of the result query. In a known process, upon receipt of an outer join query and based on the values of a particular row from a query result, a query result may fetch all forward and backward rows of the query by generating separate queries from the original query. One is for forward paging or a forward cursor and one is for backward paging or a reverse cursor, both of which directions being used to create a filter.

An exemplary process for processing an inner join may be taken from a Microsoft Business Framework (MBF) Persistent block reading design comprising generation of a where tree, This exemplary process described below is specific only for a value-based paging for an inner join. A problem may be defined as follows for providing for forward and backward paging: given an SQL SELECT query and a selected row in the result of that query, generate two separate queries such that a forward query and a backward query yield all subsequent and previous rows of the query. In particular, given a plurality of n Order By Segments ($OBS_{1-n}$) present in an Order By and the Values ($V_{1-n}$) for each segment in the current row and an operator ($op_{1-n}$), a where expression may be generated of the form:

$$(((OBS_1 == V_1) \&\& (OBS_2 == V_2) \ldots \&\& (OBS_n op_n V_n))\|$$

$$((OBS_1 = V_1) \&\& (OBS_2 == V_2) \ldots \&\& (OBS_{n-1} V_{n-1}))\|$$

$$((OBS_1 == V_1) \&\& (OBS_2 op_2 V_2))\|$$

$$(OBS_1 op_1 V_1))$$

If the original query Order By does not cover any unique key fields, then, remaining unique key fields are explicitly added. The operator $op_n$ is determined by the type of cursor or paging direction and the sort order for the $n^{th}$ segment according to the following table:

| Sort Order | Forward Paging | Reverse Paging |
|---|---|---|
| Ascending | > | < |
| Descending | < | > |

This algorithm, however, does not process outer joins successfully. The algorithm uses a comparison operator, for example, one of >, <, or = to construct a where tree. The where tree will fetch forward and backward (reverse) pages. However, since an outer join may involve the presence of NULLable records, (records with NULL value entries), processing outer join cannot presently be supported by the above algorithm. The comparison operators will provide inaccurate results or no results when a query will retrieve data results with NULL values.

A comparison operator such as > or < compares values for greater than or less than. As used herein, a comparison operator may be an inequality operator which may be defined as an operator which does not involve equality or =. Since there may be no value entered in a row of a table with a NULL, then, an inequality operator is ineffective for outer join.

Fundamentally, then, there is a need in the art for performing outer joins in addition to inner joins, for example, by value-based positioning and so be able to perform both inner and outer joins for, for example, a query statement of joined tables of an enterprise database.

Thus, while it may be known to provide for inner joins for forward and backward paging where tables have completed values, however, what are needed are systems, methods and computer program products for adapting these existing processes for performing outer join queries in an enterprise resource planning system.

SUMMARY

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

The present invention meets the above-identified needs by setting up and providing run-time systems, methods and computer program products for adapting existing processes for inner join processes to perform value-based positioning for outer join queries in an enterprise resource planning system, for example, to process NULL value results in joined tables of an enterprise database.

In an embodiment, an application object server comprises a kernel associated with a query framework and a query generation model which, in turn may utilize structured query language (SQL) or alternative language for access to a data access layer and engine and so to a record ID generator. In a method of processing an outer join for forward and reverse paging, a preliminary process comprises determining the number of Order By clauses in a received query in order to form processing loops based on the number of Order By's in the query N. A further process may take into account whether a given query involves NULL records in an outer-joined Cursor. If a current record returns a NULL record for a joined cursor, i.e., in query A outer join B . . . B is a joined cursor which is outerjoined and can potentially fetch NULL data, a where condition for the joined table may not be appended because, due to the NULL record, there is no value to use in forming a condition such as >, <, = or a combination thereof. Consequently, instead, one may create a condition on the right side of the outer join such as an "OR" condition to include recognition of a NULL record such as field name of a table is NULL in one direction or the other.

In a specific embodiment, upon receipt of an outer join query and based on the values of a particular row from a query result, a query result may fetch all forward and backward rows of the query by generating separate queries from the original query. One is for forward paging or a forward cursor and one is for backward paging or a reverse cursor, both of which directions being used to create a filter. For example, for forward paging for the Order By direction Ascending and the current row is NULL, then, an inequality operation for NULL may be IS NOT NULL and for Descending and the current row is not NULL, then the inequality operator may be changed to Original Operator OR FIELD IS NULL. Also, for forward paging, the Order By direction being Ascending and the current row is not NULL, then the inequality operator is changed to Original Operator. And for the Order By direction being Descending and the current row is NULL, then the Inequality operator is changed to Ignored.

For backward paging or a reverse cursor, the conditions are reversed. For the Order By direction being Ascending and when the current row is not NULL, then, an inequality operator may be changed to Original Operator OR FIELD IS NULL and for Descending and when the current row is NULL, then, the inequality operator may be changed to FIELD IS NOT NULL. For the order by direction Ascending and when the current row is NULL, then, the inequality condition may be changed to Ignored while for the order by direction Descending and the current row is not Null, then the inequality operator may be Original Operator. This summary of the algorithm for outer join will be further described and justified herein by way of a plurality of case scenarios. Furthermore, a paging flow summary is provided below in flowchart form.

Further features and advantages of the present invention, as well as the structure and operation of various embodiments of the present invention, are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

FIG. 1 is a block diagram illustrating an exemplary intranet client server enterprise system according to an embodiment of the present invention wherein client devices may gain access to an application object server directly or via a report server, a host server or a web server; the application object server, in turn may access a database server.

DETAILED DESCRIPTION

Figure 3:
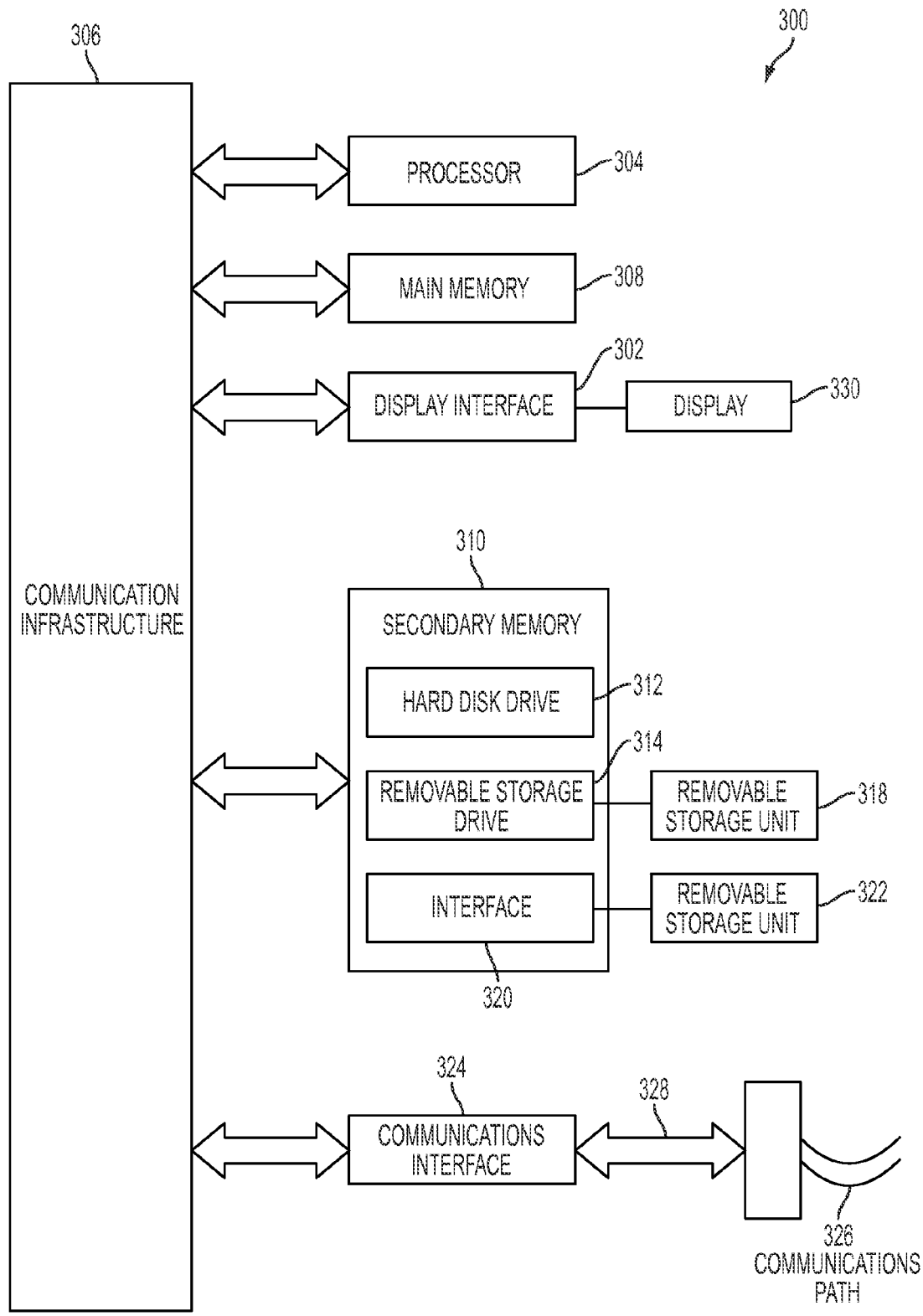
FIG. 3 is a block diagram of an exemplary computer system useful for implementing the present invention either as a client of FIG. 1 or server of FIG. 1 or FIG. 4.
Figure 4:
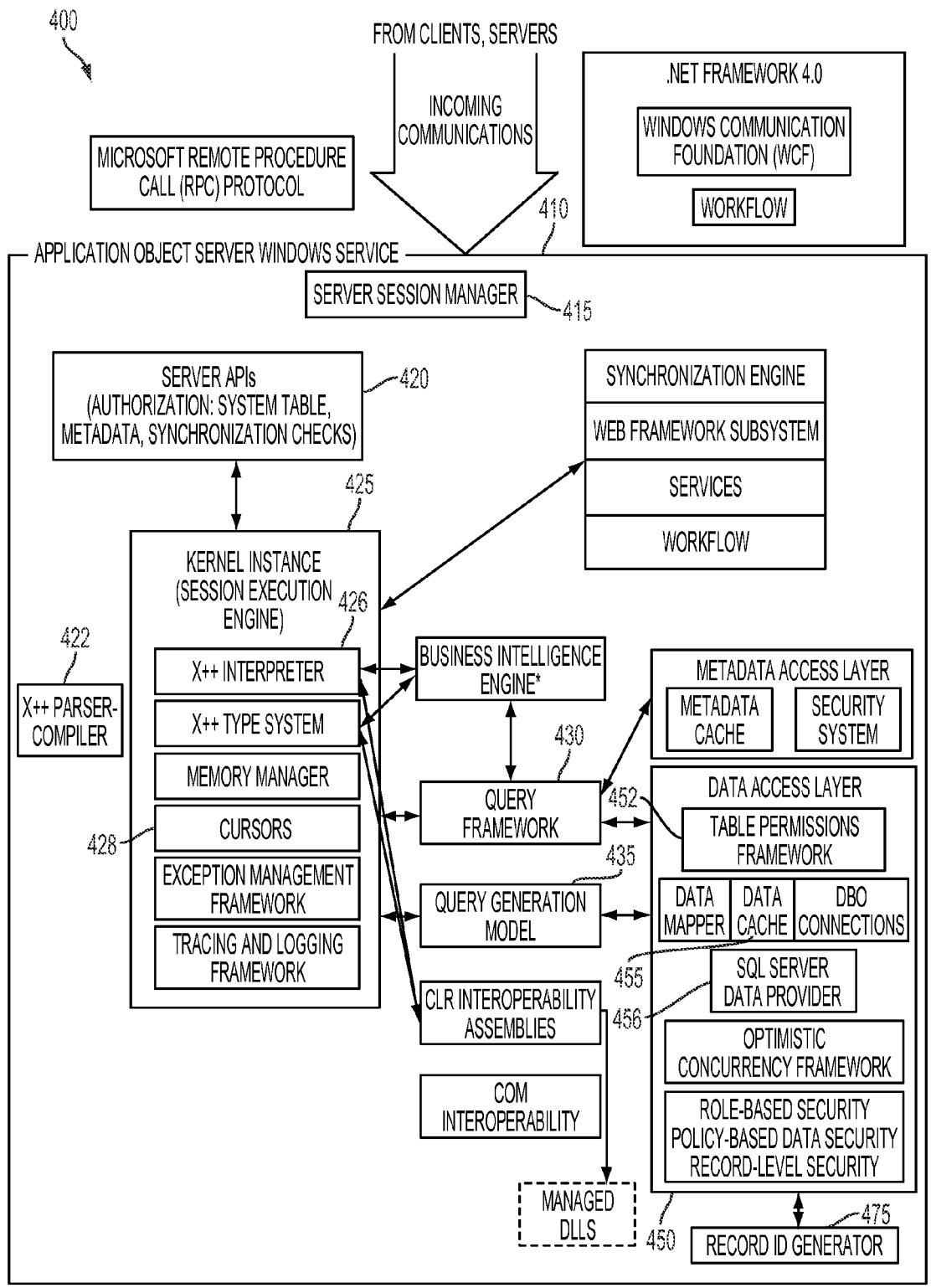
FIG. 4 is a further system architecture diagram to that of the system block diagram of FIG. 1 providing exemplary details of an application object server having a kernel instance with cursors and an $X_{++}$ interpreter, a query generation framework and model, a data access layer engine and a record identification generator for interaction with a database of FIG. 1 supporting outer join queries in an enterprise resource planning system.

The present invention is directed to systems, methods and computer program products for facilitating value-based positioning for outer join queries in an enterprise resource planning (ERP) system to supplement existing processes for inner join queries. Firstly, enterprise system architecture figures: FIG. 1, FIG. 3 and FIG. 4 will be introduced within this discussion and will be separately discussed for introducing a system architecture and an application object server and database and database server for receiving inner and outer join queries.

Then, we will provide an overview of a predicate generation algorithm and of inner join as known from Microsoft Business Framework (MBF) persistence block reading from Microsoft Dynamics AX 2009. This discussion will set the stage for generation of where trees for forward and reverse cursor for paging to achieve inner join.

Figure 2A:
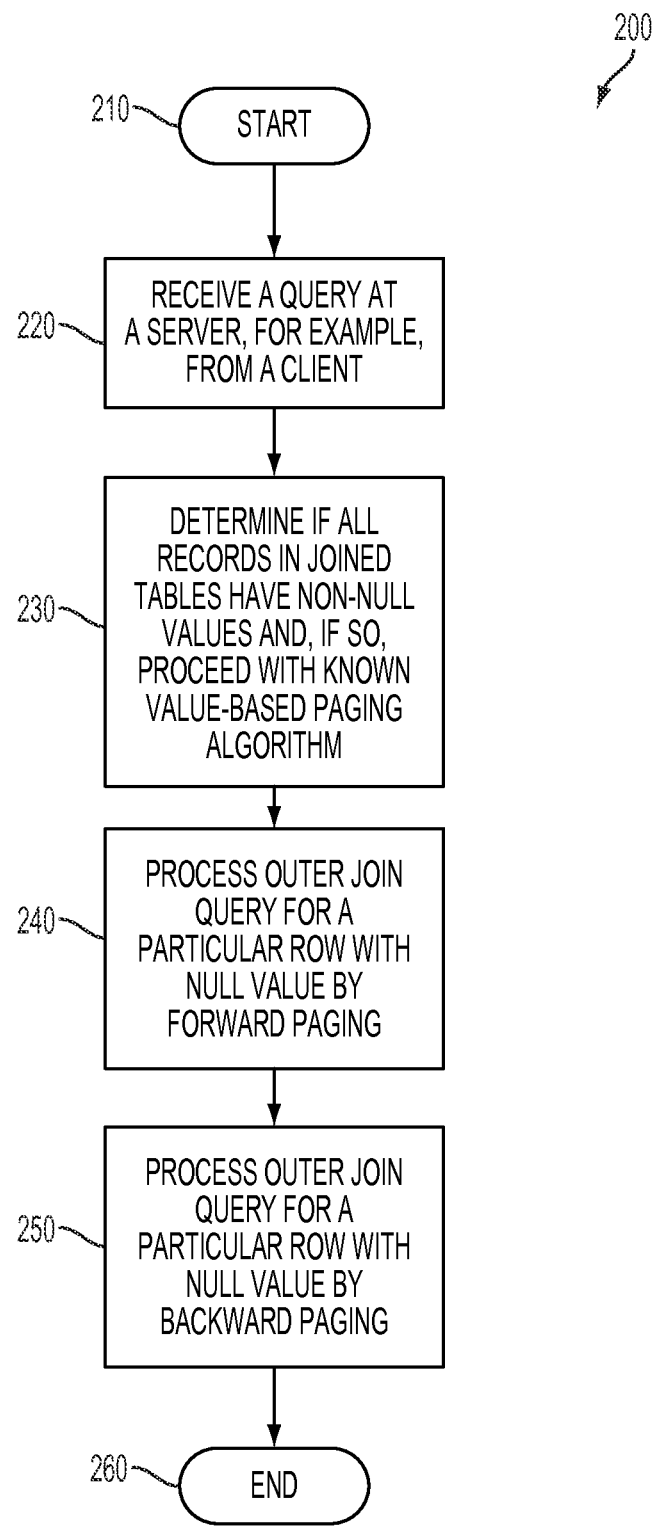
FIG. 2A provides a flowchart of an algorithm for value-based positioning for outer join queries in an enterprise system according to an embodiment of the invention and FIG. 2B provides a paging flow chart with loops to handle a number N of Order By clauses in a query.
Figure 2B:
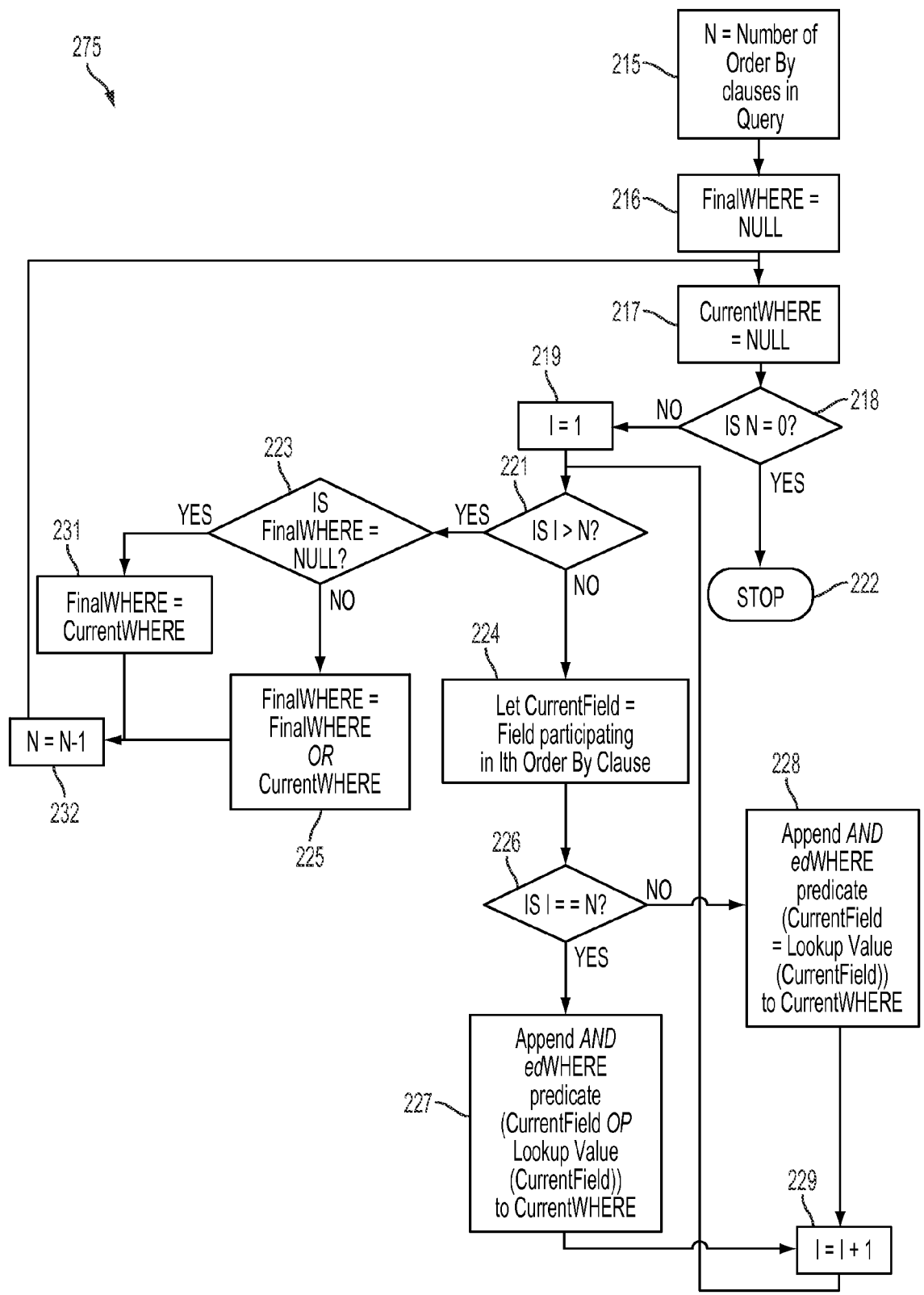

Then, we will provide a discussion of join queries and outer join in particular with emphasis on an algorithm in tabular form and per FIG. 2A to provide value-based positioning surrounding the recognition of a NULL value in a retrieval of a current row of a table in response to a database query. Moreover, a discussion of an exemplary paging flow will be discussed as depicted in FIG. 2B.

Referring now to FIG. 1, a block diagram illustrating an exemplary intranet enterprise resource planning (ERP) system 100 for an enterprise, according to an embodiment of the present invention, is shown. A client 104 may make a query of database server and database 118 via an application object server 116.

Intranet enterprise queries and database system 100 includes a plurality of users 104 (shown as users 104a-d in FIG. 1) of an enterprise accessing, via a respective computing device 104 (also, shown as devices 104a-d in FIG. 1), an organization's intranet (i.e., private network) 106 via wired or wireless communication links 122, 124, 126 and 128. Computing device 104 may be described herein as an organizational or enterprise member client. As will be appreciated by those skilled in the relevant art(s) after reading the description herein, Intranet 104 may be a private network deployed by an organization or enterprise such as a business enterprise for use by its employees. An enterprise system may, by way of example, be one for a university for use by its students and faculty, one for a government agency for its workers, and the like. As will also be appreciated by those skilled in the relevant art(s) after reading the description herein, system 100 may be deployed across one or more jurisdictions as, for example, a multinational business enterprise makes its intranet 106 available to its employees around the world. Such detail is not shown in FIG. 1.

In various embodiments, device 104 may be configured as a desktop 104a, a laptop 104b, a PDA 104c, a tablet or mobile computer 104d, an intelligent communications device or the like. Device 104, in order to access private network 106 may typically have to identify a user name and password, if not, enter further security information such as a secret key or fingerprint data to access network 106. In accordance with an embodiment of a method of dynamically querying an enterprise database, a user may access a database 118 by user name and password, the user name and password being utilized by any of servers 108, 110 and 112 to access an application object server 116 or application object server 116 may be obtained directly by a client for in turn structuring the query to database 118 as will be briefly described with reference to FIG. 4.

FIG. 1 also shows communications media 122 for a desktop computer, 124 for a laptop, 126 for an intelligent mobile device, and 128 for a tablet computer. Communications media may be of any known form, wireless or wired, fiber optic, coaxial cable, satellite and the like and utilized at any location in a network 100 including media 130, 132, 134, 136, 138, 140, 142 and 144 to connect clients to servers, servers to servers and the like.

As users 104 log into an organizational/enterprise intranet 106, they perform various computer-based tasks while logged into the organization/enterprise's intranet 106. All these data may be categorized into categories, for example: data and commands associated with setting up a process for inventory control or other activity involving updating data in tables joined by conditions or as objects in an inheritance table hierarchy. With reference to FIG. 1, an enterprise server herein referred to as an application object server 116 may comprise a Dynamics AX server running software available from Microsoft Corporation of Redmond, Wash.

Referring now to FIG. 1, a client 104 may output queries, requests for database data retrievals, insertions, updates, deletions and the like of database 118 received as, for example, an X++ statement. X++ is a special programming language, similar to C#, used with Dynamics AX known as an object-oriented language. (Other programming languages may be used as well, for example, C++ and related languages, wherein X++ is described herein by way of example).

In an alternate embodiment to FIG. 1, application object servers 116 may employ a web interface server 112 (e.g., the SHAREPOINT® web platform available from Microsoft Corporation of Redmond, Wash.), a host server 110 or a report server 108 to allow intranet administrators and clients to manage an enterprise database 118. For example, such a web platform 112 can be used as a base and can allow for complete configuration and monitoring of system 100 such as the location of log files, data filtering and the like.

In an alternate embodiment, an intranet administrator would have access to configuration, status and data retrieval servers 118 via a web service-based application programming interface (API) (e.g., Simple Object Access Protocol (SOAP) or RESTful). In such an embodiment, the intranet administrator may enforce privacy laws and business rules based on access credentials. For example, an unprivileged user might be allowed to retrieve some data being accessed within intranet 106, while an authorized user (a manager or director or owner of a work queue) may retrieve more detailed data and have additional authority for record management.

An example of a computer system 300 is shown in FIG. 3 which may either represent any client 104 or any server such as application object server 116 of FIG. 1.

Computer system 300 includes one or more processors, such as processor 304. The processor 304 may be connected to a communication infrastructure 306 (e.g., a communications bus or network). Various software aspects are described in terms of this exemplary computer system. After reading this description, it will become apparent to a person skilled in the relevant art(s) how to implement the invention using other computer systems and/or architectures. Computer system 300 may represent a client device 104 operated by an organization/enterprise member. Computer system 300 may similarly represent a server 108, 110, 112, 114 or 116 or database/database server 118 as introduced in FIG. 1 and components thereof.

Database server 118 may be an SQL or other database server responsible for maintaining for example documents, organization charts, inventory data and the like for an enterprise. As such, as a document is processed such as a purchase requisition, filters, rules and parameters and conditions and the like may be retrieved by application object server 116 using a record caching system. As will be discussed further herein, application object server 116 may comprise a data access layer engine 450 (FIG. 4) for querying database 118 in accordance with a query generation model 435 and a query framework 430 (FIG. 4) in response to a kernel instance 425.

Computer system 300 can include a display interface 302 that forwards graphics, text and other data from the communication infrastructure 306 (or from a frame buffer not shown)

for display on the display unit 330. A display interface may be what a user 102 sees on any one of devices 104. A user may type or click or use other form of data or command entry to input data/commands to a dynamic enterprise resource planning system of the present invention including inner and outer join queries.

Computer system 300 also includes a main memory 308, preferably random access memory (RAM) and may also include a secondary memory 310. The secondary memory 310 may include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well known manner. Removable storage unit 318 represents a floppy disk, magnetic tape, optical disk, etc. which is read by and written to by removable storage drive 314. As will be appreciated, the removable storage unit 318 includes a computer usable storage medium having stored therein computer software and/or data.

In alternative aspects, secondary memory 310 may include other similar devices for allowing computer programs or other instructions to be loaded into computer system 300. Such devices may include, for example, a removable storage unit 322 and an interface 320. Examples of such may include a program cartridge and cartridge interface (such as that found in video game devices), a removable memory chip (such as an erasable programmable read only memory (EPROM), or programmable read only memory (PROM)) and associated socket and other removable storage units 322 and interfaces 320, which allow software and data to be transferred from the removable storage unit 322 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a Personal Computer Memory Card International Association (PCMCIA) slot and card, etc. Software and data transferred via communications interface 324 are in the form of non-transitory signals 328 that flow over communications media 122, 124, 130, 132, 140 and so on which may be electronic, electromagnetic, optical or other signals capable of being received by communications interface 324. These signals 328 are provided to communications interface 324 via a communications path (e.g., channel) 326. This channel 326 carries signals 328 and may be implemented using wire or cable, fiber optics, a telephone line, a cellular link, an radio frequency (RF) link and other communications channels as explained above.

In this document, the terms "computer program medium" and "computer usable medium" are used to generally refer to media such as removable storage drive 314, a hard disk installed in hard disk drive 312 and signals 328. These computer program products provide software to computer system 300. The invention may be directed to such computer program products.

Computer programs (also referred to as computer control logic) are stored in main memory 308 and/or secondary memory 310. Computer programs may also be received via communications interface 324. Such computer programs, when executed, enable the computer system 300 to perform the features of the present invention, as discussed herein. In particular, the computer programs, when executed, enable the processor 304 to perform the features of the present invention. Accordingly, such computer programs represent controllers of the computer system 300.

In an embodiment where the invention is implemented using software, the software may be stored in a computer program product and loaded into computer system 300 using removable storage drive 314, hard drive 312 or communications interface 324. The control logic (software), when executed by the processor 304, causes the processor 304 to perform the functions of the invention as described herein.

Referring now to FIG. 4, there is shown a system architecture for an application object server 116 (FIG. 1) which supports data caching. Incoming communications are received from clients and other servers per FIGS. 1 and 3 which may comprise database related communications. There are shown the following elements of application object server 410 (FIG. 1, server 116): a server session manager 415 which may provide overall session management, server API's for various functions and features identified 420, and a kernel instance 425 and, within kernel instance 425, there is cursors 428. A cursor may represent an instance of a table in a join statement. The kernel instance 425 may be coupled to a data access layer 450 or engine via a query framework 430 and a query generation model 435. Within the data access layer 450 may be a data cache 455 and a record ID generator 475.

Now, an algorithm for inner join will be described which may be the basis for performing value-based outer join processing. An algorithm for generating predicates generally and where predicates in particular in the Dynamics AX ERP system comprises determining key fields. These key fields comprise a primary key field, if a table of a database has a Primary Key, else, a record index RecId field, if the table has a RecId-Index field, else, if a table has a Unique Index or Indexes, else, an exception is raised and the process terminates. So assuming that one of these key fields is present, key values are appended to an end of an Order By, if the appendages do not already exist for the value. Appending key values to the end of an Order By ensures that values are returned in a consistent order and records are not missed in a join query. The key field unique index or indexes may have more than one field and some of these may be already processed. With the appending process, we are making sure that remaining indexes are appended and it is not necessary to append fields already appended. Next, we create a reverse cursor or paging as a clone of a current cursor or paging. Then, a forward where condition is built, and the forward where condition may be AND'ed to the current forward cursor or paging direction. Similarly, a reverse where condition may then be built, and the reverse where condition may AND'ed to the reverse cursor or paging direction. For shared tables, RecId (form Record ID generator 475) may be unique in the table; (they do not, for example, have a Data Area identifier field). Not satisfying this assertion may result in an error condition.

To generate a where tree for forward and reverse where conditions, the query is examined for Order By's. In particular, given a plurality of n Order By Segments ($OBS_{1-n}$) present in an Order By and the Values ($V_{1-n}$) for each segment in the current row and an operator ($op_{1-n}$), a where expression may be generated of the form:

$$((( OBS_1 == V_1) \&\& (OBS_2 == V_2) \ldots \&\& (OBS_n op_n V_n))\|$$

$$((OBS_1 = V_1) \&\& (OBS_2 == V_2) \&\& (OBS_{n-1} op_{n-1} V_{n-1}))\|$$

$$((OBS_1 == V_1) \&\& (OBS_2 op_2 V_2))\|$$

$$(OBS_1 op_1 V_1))$$

If the original query Order By does not cover any unique key fields, then, remaining unique key fields are explicitly added.

The operator $op_n$ is determined by the type of cursor or paging direction and the sort order for the $n^{th}$ segment according to the following table:

| Sort Order | Forward Paging | Reverse Paging |
|---|---|---|
| Ascending | > | < |
| Descending | < | > |

This algorithm, however, does not process outer joins successfully. The algorithm uses a comparison operator, for example, one of >, <, or = (or possibly a combination of these) to construct a where tree. The where tree will fetch forward and backward (reverse) pages. However, since an outer join may involve the presence of NULLable records, (records with NULL value entries), processing outer join cannot presently be supported by the above algorithm. The comparison operators will provide inaccurate results or no results with NULL values.

Processing Outer Joins with Value-Based Paging

Processing outer joins with value-based paging will now be discussed with reference to FIG. 2A and forward and reverse paging tables provided below. The outer join process 200 of FIG. 2A begins at start process 210 on receipt of an incoming query typically from a client 104 (FIG. 1). At process 220, the incoming query is received at an application object server 116 (FIG. 1) in accordance with a query framework 430 and a query generation model 435 (FIG. 4). At process 230, the algorithm described above is called for join queries having no NULL values in the pulled results of the query. More importantly, value-based outer join query processing begins at processes 230 and 240.

Given an outer join query and all values of a particular row from the query result being examined iteratively, two separate queries may result for fetching forward and backward rows of the original query in order to generate appropriate filter conditions. The following table summarizes a process for generating exemplary filter conditions for a given Order by field to expand into an appropriate filter for forward paging or forward cursor process 240.

Forward Paging

| Order By direction | Is current row NULL? | Inequality operator changed to |
|---|---|---|
| ASC | Yes | IS NOT NULL |
| ASC | No | Original Operator |
| DESC | Yes | Ignored |
| DESC | No | Original Operator OR FIELD IS NULL |

It may be appreciated that the above table for Forward Paging or a forward cursor may be easily derived for backward paging process 250 (FIG. 2A) as follows:

Backward Paging

| Order By direction | Is current row NULL? | Inequality operator changed to |
|---|---|---|
| ASC | Yes | Ignored |
| ASC | No | Original Operator OR FIELD IS NULL |
| DESC | Yes | FIELD IS NOT NULL |
| DESC | No | Original Operator |

When described in words, these tables may be described as follows. First, forward paging process 240 will be described where ASC refers to an ascending Order By direction and DESC refers to a descending Order By direction. For forward paging or a forward cursor for the Order By direction Ascending and the current row is NULL, then, an inequality operation for NULL may be IS NOT NULL. For Order By direction Descending and the current row is not NULL, then the inequality operator may be changed to Original Operator OR FIELD IS NULL. Also, for forward paging, the Order By direction being Ascending and the current row is not NULL, then the inequality operator is changed to Original Operator. And for the Order By direction being Descending and the current row is NULL, then the Inequality operator is changed to Ignored.

For backward paging or a reverse cursor process 250, according to the above table, the conditions are practically reversed. For the Order By direction being Ascending and when the current row is not NULL, then, an inequality operator may be changed to Original Operator OR FIELD IS NULL and for Descending and when the current row is NULL, then, the inequality operator may be changed to FIELD IS NOT NULL. For the order by direction Ascending and when the current row is NULL, then, the inequality condition may be changed to Ignored while for the order by direction Descending and the current row is not Null, then the inequality operator may be Original Operator.

Thus, value-based positioning for outer join comprises iterative steps associated with evaluating a current row for a NULL value and creating a where predicate according to the returned value and whether the order by direction is forward or reverse (backward).

Demonstration of Tabular Summary

The following section further elaborates of the explanation for forward paging process 240. A similar discussion fir backward paging 250 will not be provided to as backward paging follows from forward paging in reverse manner.

The following is a fictitious query provided as if coming from a client 104 to an application object server 116 (FIG. 1) or server 410 (FIG. 4) for sales data:

SELECT SalesID, ItemID
FROM SalesTable LEFT OUTER JOIN SalesLine ON
SalesTable.SalesID = SalesLine.SalesID
ORDER BY SalesLine.ItemID ASC, SalesTable.SalesID ASC Each case in above summary is described below. In the result set from the query, the data record in BOLD is the current selected record.

Case 1: With Order By ASC and a current row has a NULL value, the query result will look like that below.

With selected record as (2, NULL) tuple as indicated in BOLD below.

| SalesTable.SalesID | SalesLine.ItemID |
|---|---|
| 2 | NULL |
| 3 | NULL |
| 1 | 1000 |
| 4 | 4000 |

All NULL values for that field will appear together in the beginning. An Inequality operator needs to include remaining Non-NULL values for the field which will be achieved by FIELD IS NOT NULL predicate as shown below.

A generated WHERE predicate with the IS NOT NULL shown in BOLD:

(SalesLine.ItemID IS NULL AND SalesTable.SalesID >= 2)   //fetches row number 1 to 2
OR
(SalesLine.ItemID IS NOT NULL)   //fetches row number 3 to 4

Now, we provide a second case, by way of example:
Case 2: With Order By ASC and a current row has a non-NULL value, the query will be the same as Case 1 above but just the current record will change. For an example, the selected record may be the (1,1000) tuple shown in BOLD as per below.

| SalesTable.SalesID | SalesLine.ItemID |
|---|---|
| 2 | NULL |
| 3 | NULL |
| 1 | 1000 |
| 4 | 4000 |

In the abover, it may not be necessary to include any NULL value for ItemID because all NULL values in ItemID are in backward pages, so an inequality operator will remain as it is. A Generated WHERE predicate follows:

(SalesLine.ItemID = 1000 AND SalesTable.SalesID >= 1)   //fetches row number 3
OR
(SalesLine.ItemID > 1000)   //fetches row number 4

Now, a third case will be discussed.
Case 3: With Order By DESC and current row has NULL value, the query will look like that below.

SELECT SalesID, ItemID
FROM SalesTable LEFT OUTER JOIN SalesLine ON

-continued

SalesTable.SalesID = SalesLine.SalesID
ORDER BY SalesLine.ItemID DESC, SalesTable.SalesID ASC For example, if a selected record is the (1,NULL) tuple as shown below. A (2, NULL) tuple is shown in BOLD.

| SalesTable.SalesID | SalesLine.ItemID |
|---|---|
| 4 | 4000 |
| 1 | 1000 |
| 2 | NULL |
| 3 | NULL |

In this case, all values appearing in ItemID for forward paging will be NULL. So an inequality operator for ItemId may be changed to IS NOT NULL then the query will also fetch backward paging records which is not appropriate. Thus, the inequality will be ignored. The Generated WHERE tree will be as follows:

(SalesLine.ItemID IS NULL AND SalesTable.SalesID>=2)// fetches row numbers 3 to 4

Now a fourth case will be discussed.
Case 4: With Order By DESC and current row has non-NULL value, the query will remain as case above, but selected record will change. Let's assume the selected record to be (2,4000) tuple and the tuple (4,4000) is shown in BOLD.

| SalesTable.SalesID | SalesLine.ItemID |
|---|---|
| 4 | 4000 |
| 1 | 1000 |
| 2 | NULL |
| 3 | NULL |

In this case, the resultant set (resultset) will contain ItemID values which are smaller than current value (1000) and NULL values. So an inequality operator will remain as it is and (ItemID IS NULL) condition will be ORed with it shown in BOLD below.

Generated WHERE Tree:

(SalesLine.ItemID = 4000 AND SalesTable.SalesID >= 4)   //fetches row number 1
OR
( SalesLine.ItemID < 4000 OR SalesLine.ItemID IS NULL )   //fetches rows 2 to 4

As explained above, reverse paging may be handled in reverse per the tables provided above. Now, FIG. 2B will be discussed which provides an overall paging flow 275 where a preliminary process is determining the number N of Order By clauses in a given received query. In process 215, N is set equal to the number of Order By clauses in the given query.

The process 275 then proceeds with process 216 in which a FinalWhere value is set equal to NULL. As will be explained below, a decrementing process 232 return arrow is shown returning to the connection of processes 216 and 217 and process 217 follows. Process 217 comprises setting CurrentWhere to equal NULL. Once process 217 is completed, decision process 218 comprises determining whether the value of N is currently equal to 0. If Yes, then, process 275 is completed at Stop process 222. Otherwise, the process 275 continues to process 219 where a parameter value I is set to a value of 1. Between process 219 and process 221, as will be described below, incrementing process 229 joins the output of process 219 as it follows to decision process 221 asking whether I is greater than N.

Following the No path from process 221, process 224 follows in which the CurrentField value is set equal to a Field value participating in the Ith Order By clause. Decision process 226 follows CurrentField setting process 224 determining whether I is ==N. If the answer is No, then, at process 228, one appends an AND'ed WHERE predicate (CurrentField=Lookup Value (CurrentField) to Current-WHERE. If the answer is Yes, then process 227 follows process 226 and one appends an ANDed WHERE predicate (CurrentField OP LookupValue (CurrentField)) to Current WHERE. Both processes 228 and 229 lead to process 229 which comprises incrementing I by 1 or I=I+1.

Now, we return to process 221 with a Yes result of IS I>N? If Yes, then, process 223 follows. At decision process 223, the process determines IS FinalWhere=NULL?. If the result is No, then, process 225 follows. Process 225 comprises setting FinalWHERE=FinalWhere OR CurrentWhere. If the result of process 223 is Yes, then, process 231 results. Process 231 comprises setting FinalWHERE=CurrentWhere.

Processes 225 and 231 both lead to a decrementing process 232. Decrementing process 232 comprises setting N=N−1. Process 232 leads to process 217 as described above. All of the Order By's N finally being processed, then the process 275 terminates at process 222.

As will be apparent to one skilled in the relevant art(s) after reading the description herein, the computer architectures shown in FIGS. 1, 3 and 4 may be configured as a desktop, a laptop, a server, a tablet computer, a PDA, a mobile computer, an intelligent communications device or the like. The $X_{++}$ programming language is one of many programming languages that may be used known in the art of enterprise resource planning systems, for example, C# is one alternative. Any of these architectures may be under the personal control of a user client 104 and may be operated transparent to other database processes, for example, for data entry/retrieval of inventory data, purchase order data, request for proposal data, marketing and sales data and related organizational hierarchy data as well as other data relevant to the querying for data to improve overall system efficiency according to inner join and outer join conditions as described above.

In yet another embodiment, the invention is implemented using a combination of both hardware and software and communications media may be wireless, wired or other form of communication recognizing any need for security of data of the enterprise.

While various aspects of the present invention have been described above, it should be understood that they have been presented by way of example and not limitation. It will be apparent to persons skilled in the relevant art(s) that various changes in form and detail can be made therein without departing from the spirit and scope of the present invention. Thus, the present invention should not be limited by any of the above described exemplary aspects, but should be defined only in accordance with the following claims and their equivalents.

In addition, it should be understood that the figures in the attachments, which highlight the structure, methodology, functionality and advantages of the present invention, are presented for example purposes only. The present invention is sufficiently flexible and configurable, such that it may be implemented in ways other than that shown in the accompanying figures. For example, the systems, methods and computer program products for facilitating the querying of data of a database in an intranet environment may be also applicable to other networks such as internets.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present invention in any way.

What is claimed is:

1. A computer-implemented method comprising:
  receiving a query at a server, the query including:
    a selected record,
    an outer join that provides a joined table having NULLable records, and
    an Order By clause that provides a sort order for ordering records in the joined table based on one or more fields of the joined table; and
  generating, by the server, a separate query configured to fetch from the joined table a current row that corresponds to the selected record and either subsequent rows or previous rows relative to the current row, wherein generating the separate query comprises:
    determining whether a paging direction of the separate query is forward paging or backward paging,
    determining whether the sort order for the Order By clause is ascending or descending,
    determining an original inequality operator based on the sort order for the Order By clause and the paging direction of the separate query,
    determining whether the current row returns a NULL value, and
    generating a WHERE condition for the separate query configured to either change the original inequality operator or ignore the original inequality operator depending on whether the paging direction of the separate query is forward paging or backward paging, whether the sort order of the Order By clause is ascending or descending, and whether the current row returns a NULL value.

2. The computer-implemented method of claim 1, wherein: the original inequality operator is changed to IS NOT NULL when the paging direction of the separate query is forward paging, the sort order for the Order By clause is ascending, and the current row returns a NULL value.

3. The computer-implemented method of claim 1, wherein: the original inequality operator is ignored when the paging direction of the separate query is forward paging, the sort order for the Order By clause is descending, and the current row returns a NULL value.

4. The computer-implemented method of claim 1, wherein: the original inequality operator is changed to include an OR FIELD IS NULL condition when the paging direction of the separate query is forward paging, the sort order for the Order By clause is descending, and the current row returns only non-NULL values.

5. The computer-implemented method of claim 1, further comprising wherein:
  the original inequality operator is ignored when the paging direction of the separate query is backward paging, the sort order for the Order By clause is ascending, and the current row returns a NULL, value.

6. The computer-implemented method of claim 1, wherein: the original inequality operator is changed to include an OR FIELD IS NULL condition when the paging direction of the separate query is backward paging, the sort order for the Order By clause is ascending, and the current row returns only non-NULL values.

7. The computer-implemented method of claim 1, wherein: the original inequality operator is changed to IS NOT NULL when the paging direction of the separate query is backward paging, the sort order for the Order By clause is descending, and the current row returns a NULL value.

8. A memory device storing computer program instructions that, when executed by a processor of a computer, cause the computer to perform a computer-implemented method comprising:
receiving a query including: a selected record, an outer join that provides a joined table having NULLable records, and an Order By clause that provides a sort order for ordering records in the joined table based on one or more fields of the joined table; and
generating, by the server, a separate query configured to fetch from the joined table a current row that corresponds to the selected record and either subsequent rows or previous rows relative to the current row, wherein generating the separate query comprises:
determining whether a paging direction of the separate query is forward paging or backward paging,
determining whether the sort order for the Order By clause is ascending or descending,
determining an original inequality operator based on the sort order for the Order By clause and the paging direction of the separate query,
determining whether the current row returns a NULL value, and
generating a WHERE condition for the separate query configured to either change the original inequality operator or ignore the original inequality operator depending on whether the paging direction of the separate query is forward paging or backward paging, whether the sort order for the Order By clause is ascending or descending, and whether the current row returns a NULL value.

9. The memory device of claim 8, wherein:
the original inequality operator is changed to IS NOT NULL when the paging direction of the separate query is forward paging, the sort order for the Order By clause is ascending, and the current row returns a NULL value.

10. The memory device of claim 8, wherein:
the original inequality operator is ignored when the paging direction of the separate query is forward paging, the sort order for the Order By clause is descending, and the current row returns a NULL value.

11. The memory device of claim 8, wherein:
the original inequality operator is changed to include an OR FIELD IS NULL condition when the paging direction of the separate query is forward paging, the sort order for the Order By clause is descending, and the current row returns only non-NULL values.

12. The memory device of claim 8, wherein:
the original inequality operator is ignored when the paging direction of the separate query is backward paging, the sort order for the Order By clause is ascending, and the current row returns a NULL value.

13. The memory device of claim 8, wherein:
the original inequality operator is changed to include an OR FIELD IS NULL condition when the paging direction of the separate query is backward paging, the sort order for the Order By clause is ascending, and the current row returns only non-NULL values.

14. The memory device of claim 8, wherein:
the original inequality operator is changed to IS NOT NULL when the paging direction of the separate query is backward paging, the sort order for the Order By clause is descending, and the current row returns a NULL value.

15. A computer system comprising:
a processor for executing computer program instructions; and
memory storing computer program instructions that, when executed by the processor, cause the computer to perform a computer-implemented method comprising:
receiving a query including: a selected record, an outer join that provides a joined table having NULLable records, and an Order By clause that provides a sort order for ordering records in the joined table based on one or more fields of the joined table; and
generating a separate query configured to fetch from the joined table a current row that corresponds to the selected record and either subsequent rows or previous rows relative to the current row, wherein generating the separate query comprises:
determining whether a paging direction of the separate query is forward paging or backward paging,
determining whether the sort order for the Order By clause is ascending or descending,
determining an original inequality operator based on the sort order for the Order By clause and the paging direction of the separate query,
determining whether the current row returns a NULL value, and
generating a WHERE condition for the separate query configured to either change the original inequality operator or ignore the original inequality operator depending on whether the paging direction of the separate query is forward paging or backward paging, whether the sort order of the Order By clause is ascending or descending, and whether the current row returns a NULL value.

16. The computer system of claim 15, wherein:
the original inequality operator is changed to IS NOT NULL when the paging direction of the separate query is forward paging, the sort order for the Order By clause is ascending, and the current row returns a NULL value.

17. The computer system claim 15, wherein:
the original inequality operator is ignored when the paging direction of the separate query is forward paging, the sort order for the Order By clause is descending, and the current row returns a NULL value.

18. The computer system of claim 15, wherein:
the original inequality operator is ignored when the paging direction of the separate query is backward paging, the sort order for the Order By clause is ascending, and the current row returns a NULL value.

19. The computer system of claim 15, wherein:
the original inequality operator is changed to IS NOT NULL when the paging direction of the separate query is backward paging, the sort order for the Order By clause is descending, and the current row returns a NULL value.

20. The computer system of claim 15, wherein:
the original inequality operator is changed to include an OR FIELD IS NULL condition when the current row returns only non-NULL values and either:
the paging direction of the separate query is forward paging and the sort order for the Order By clause is descending, or
the paging direction of the separate query is backward paging and the sort order for the Order By clause is ascending.

* * * * *